US012432830B2

(12) United States Patent
Sherriff

(10) Patent No.: US 12,432,830 B2
(45) Date of Patent: Sep. 30, 2025

(54) CLONED CONSTANT CURRENT LED DRIVE CIRCUIT AND METHOD FOR USE

(71) Applicant: Methode Electronics, Inc., Chicago, IL (US)

(72) Inventor: Eric D. Sherriff, Nelson (CA)

(73) Assignee: Methode Electronics, Inc., Chicago, IL (US)

( * ) Notice: Subject to any disclaimer, the term of this patent is extended or adjusted under 35 U.S.C. 154(b) by 301 days.

(21) Appl. No.: 17/895,488

(22) Filed: Aug. 25, 2022

(65) Prior Publication Data

US 2022/0408529 A1 Dec. 22, 2022

Related U.S. Application Data

(63) Continuation-in-part of application No. 17/387,283, filed on Jul. 28, 2021, now Pat. No. 11,464,095.

(60) Provisional application No. 63/091,511, filed on Oct. 14, 2020.

(51) Int. Cl.

| | |
|---|---|
| ***H05B 45/30*** | (2020.01) |
| ***H05B 45/345*** | (2020.01) |
| ***H05B 45/46*** | (2020.01) |

(52) U.S. Cl.

CPC .......... *H05B 45/345* (2020.01); *H05B 45/46* (2020.01)

(58) Field of Classification Search

CPC ...... H05B 45/20; H05B 45/34; H05B 45/345; H05B 45/46; H05B 47/10

See application file for complete search history.

(56) References Cited

U.S. PATENT DOCUMENTS

| | | | | |
|---|---|---|---|---|
| 7,952,295 | B2 | 5/2011 | Otake | |
| 8,358,080 | B2 | 1/2013 | Nakamura | |
| 9,247,599 | B2 * | 1/2016 | Lee | H05B 45/48 |

FOREIGN PATENT DOCUMENTS

| | | | | |
|---|---|---|---|---|
| KR | 2440007 B1 * | 9/2022 | | H05B 33/0815 |

* cited by examiner

*Primary Examiner* — Jimmy T Vu

(74) *Attorney, Agent, or Firm* — Greenberg Traurig, LLP

(57) ABSTRACT

A light emitting diode (LED) circuit is disclosed having an LED having a plurality of current paths. A controller may be included for controlling the LEDs. The LED is connected to a first transistor and a first current sink to drive a constant current through the LED through a first current path. At least one cloning transistor can establish a parallel current path through the LED and parallel to the first current path and is connected such that the constant current in the first current sink is duplicated in the parallel current path.

17 Claims, 3 Drawing Sheets

CLONED CONSTANT CURRENT LED DRIVE CIRCUIT AND METHOD FOR USE

CROSS-REFERENCE TO RELATED APPLICATION

This application is a continuation-in-part application of U.S. application Ser. No. 17/387,283, filed Jul. 28, 2021, which claims priority under 35 U.S.C. § 119(e) to U.S. Provisional patent application No. 63/091,511, filed Oct. 14, 2020, which are hereby incorporated by reference in their entirety.

BACKGROUND OF THE INVENTION

Light emitting diodes (LEDs) used in automotive and other applications often need to be driven with a constant current to meet optical and/or electrical design specifications and other requirements. In particular, in automotive applications, a constant current state can control light output from LEDs over a range of ambient and operating temperatures expected during vehicle operations. Moreover, a constant current can control light output from LEDs in the case of varying supply voltages that, depending on battery design and state of health, may deviate from nominal 12 volts by a significant amount.

Existing LEDs products for automotive and other application may not use constant current at all, in which case their performance is inferior. Others use multiple integrated circuit (IC) to drive multiple LEDs, or special integrated circuits capable of driving multiple LEDs, which increase the product's cost.

What is needed, therefore, is a low-cost electronic circuit design that can drive multiple LEDs with constant current having an integrated circuit controller (or other device, circuit, or component arrange) that provides constant current to drive one LED (or a few LEDs) and that allows for the current in the one (or few) LEDs to be copied (cloned) for other LEDs.

SUMMARY OF THE INVENTION

Disclosed herein are example red, green, and blue (RGB) light emitting diodes (LED) in a module for use in automotive and other applications. Also disclosed is an exemplary circuit in which a particular current path driving the RGB LEDs is cloned for respective additional RGB LEDs. The LED circuits may include, for example, a plurality of LEDs each having a respective current path. A controller and related software may be used for controlling the plurality of LEDs.

Also disclosed herein are methods of controlling the RGB module by interfacing the same with an electronics system of an automobile or other system in which the module is integrated.

In one aspect, the module includes a plurality of LEDs each having a respective current path, and each of the of LEDs is adapted for outputting a user-selectable white or non-white light. An electrical connection is used for connecting the module to an external electrical system for power and, optionally, control. A software stored in a storage media device may be used for controlling electrical signals to the plurality of LEDs. A first set of LEDs of the plurality of LEDs may be red, blue, and green (RBG) LEDs and are connected to respective transistors and a current sink to drive a constant current through each of the RGB LEDs. At least one second set of LEDs of the plurality of LEDs are also RGB LEDs and are connected such that the constant current in the first set of LEDs is duplicated (cloned) in the at least one second set of RGB LEDs.

In another aspect, the LED circuit includes a plurality of LEDs each having a respective current path, and each is adapted for outputting a user-selectable white or non-white light. A controller is used to control the plurality of LEDs. The controller may include a software stored in a storage media device. A current sink may be used for driving a constant current through the plurality of LEDs, as described above.

In still another aspect, the circuit design employs only low-cost commodity components to provide additional LED drives, such as low cost transistor and resistor sets.

In another aspect, the circuit can be adapted to integrated circuits that source current by inverting the topology and changing the polarity of the transistors to NPN.

In still another aspect, the scaling granularity of the circuit from one set to multiple sets of LEDs is considered "perfect" in that there may be one additional resistor and transistor needed for each additional LED, so there is no penalty or advantage to any particular number of LEDs that are cloned.

In addition, multiple cloned LED drives could be combined to drive a higher current through one higher power LED instead of multiple LEDs.

In another aspect, the modules and circuits as shown and described may be used to drive multiple LEDs with constant current in any product, including those found in transportation systems (e.g., automotive, rail, and aerospace), industrial systems, consumer products (e.g., entertainment devices and household appliances), and medical devices that output or require illumination.

Disclosed herein are light emitting diode (LED) lighting modules having an LED having a plurality of parallel current paths, an electrical connection for connecting the module to an external electrical system, and optionally a software stored in a storage media device for controlling electrical signals to the LED, and one of the plurality of current parallel paths is connected to a sensing transistor and a current sink to drive a constant current through the LED and each of the other of the plurality of current path have cloning transistors, and wherein the bases of each of the cloning transistors and the sensing transistors are electrically connected to each other. Disclosed here are light emitting diode (LED) circuits having an LED having a plurality of current paths, a controller for controlling the LED, where the LED is connected to a first transistor and a first current sink to drive a constant current through the LED through a first current path, and at least one cloning transistor establishes a parallel current path through the LED and parallel to the first current path and is connected such that the constant current in the first current sink is duplicated in the parallel current path.

In one aspect of the disclosure the controller comprises a software stored in a storage media device. In another aspect of the disclosure the parallel current path is connected sink to a current sink separate from the first current sink. In yet another aspect of the disclosure, the first transistor includes a first transistor base and a first transistor collector and each of the respective first transistor base and first transistor collector are respectively electrically connected to each other. In still another aspect of the disclosure an LED circuit includes a plurality of cloning transistors with, respectively, a plurality of parallel current paths, where each of the plurality of cloning transistors includes a cloning transistor base and a cloning transistor collector, and at least one first transistor base is electrically connected to at least one cloning transistor base.

In one aspect of the disclosure, the first current sink is an integrated circuit LED driver. In another aspect of the disclosure a combined current through an LED is greater than the constant current sink in the first current sink. In another aspect of the disclosure, an integrated circuit LED driver has a plurality of current sinking pins and each current sinking pin is associate with an LED, a respective first transistor, and at least one cloning transistor. In yet another aspect of the disclosure, a combined total of first current path and parallel current path outnumbers a number of current sinking pins of the controller. In another aspect of the disclosure, each first transistor base is electrically connected, respectively, to each of the cloning transistor bases.

In one aspect of the disclosure, each of the cloning transistors includes a cloning transistor emitter and each cloning transistor emitter is electrically connected to a voltage supply through a sense transistor resistor. In another aspect of the disclosure each of the first transistor comprises a first transistor emitter and the first transistor emitter is electrically connected to the voltage supply through a, respective, driver transistor resistor. In one aspect of the disclosure, a driver transistor resistor has a driver transistor resistance, a sense transistor resistor has a sense transistor resistance, and the driver transistor resistance is about the same as the sense transistor resistance. In another aspect of the disclosure, a driver transistor resistor has a driver transistor resistor voltage drop and a sense transistor resistor has a sense transistor resistor voltage drop and the driver transistor resistor voltage drop and the sense transistor resistor voltage drop are about equal. In yet another aspect of the disclosure, a driver transistor resistor has a driver transistor resistance, a sense transistor resistor has a sense transistor resistance, and the sense transistor resistance is higher than the driver transistor resistance. In another aspect of the disclosure, a sense transistor resistance is higher than the driver transistor resistance by about one step on the EIA E96 resistor value table.

DETAILED DESCRIPTION OF THE INVENTION

Figure 1:
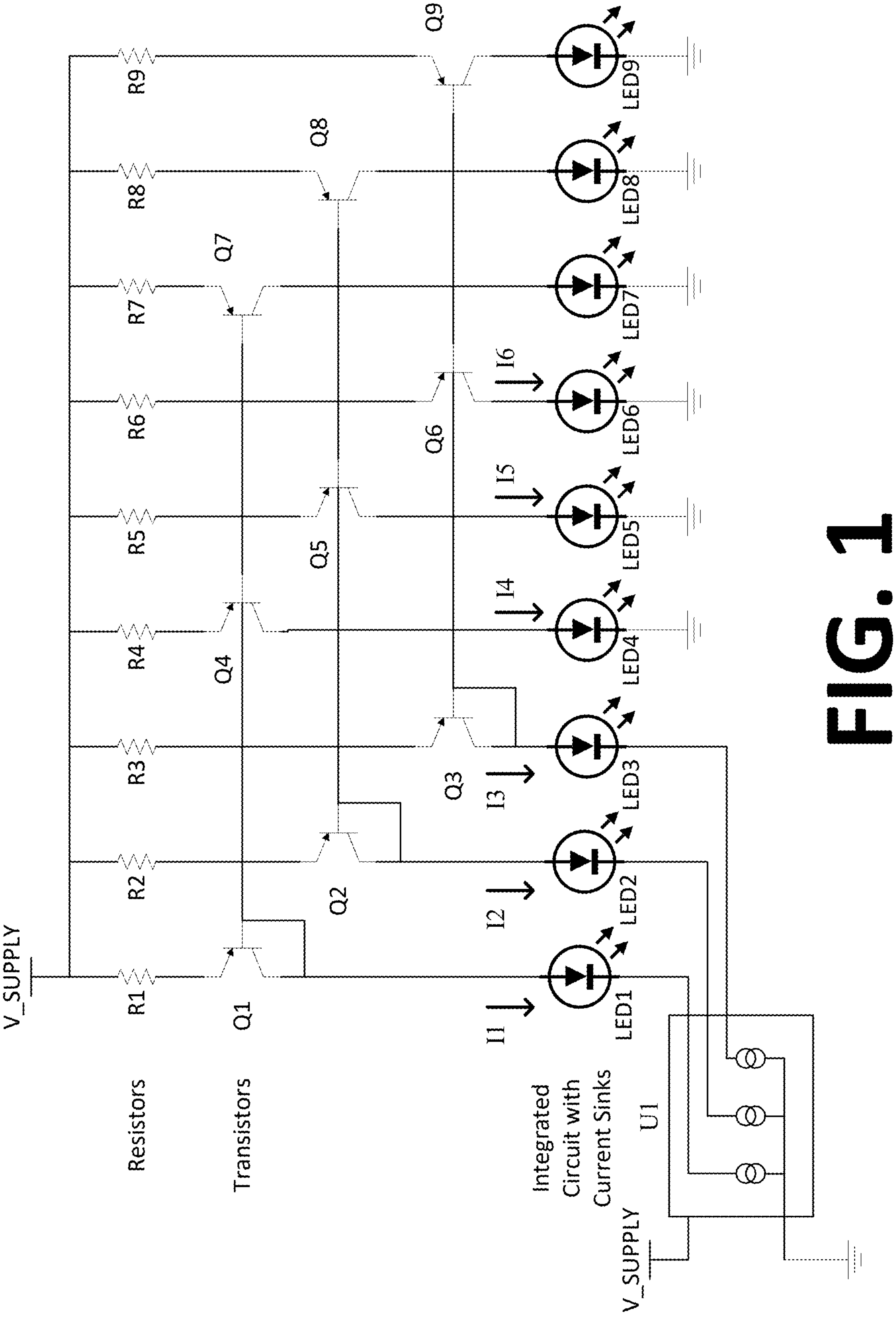
FIG. 1 is a schematic drawing of an RGB LED integrated circuit showing a primary RGB LED constant current circuit and two cloned RGB LED circuits.

With reference to FIG. 1, shown therein is an integrated circuit LED driver (U1) that has at least three current sinking pins or connections (i.e. current is regulated as it is returned, or sinks, to ground), resistors R1 through R9, corresponding transistors Q1 through Q9, and corresponding LEDs identified as LED1 through LED9. While, U1 is shown having at least three current sinking pins to correlate with the three LED channels of an RGB LED, this description is equally applicable to the cloning of current from one or more LEDs or LED channels. Similarly, all of the LED channels connected to U1 need not be cloned (as discussed below). However, for the purposes of this disclosed example, all three of the available LED channels for RGB will each be cloned. In addition, the current sink need not be an integrated circuit, but could also be one or more discrete design current sinks, but the discussion below will utilize the example integrated circuit current sink for example purposes.

LED driver U1 is suitable for driving an RGB arrangement of LEDs. It accurately sets the current through LED1, LED2, and LED3. The current-setting mechanism may be resistors external to the integrated circuit LED driver, or the current sinks may be software controlled by a processor included in the integrated circuit LED driver.

LED driver U1 may have three sinking pins or connections for controlling the three different LED channels of a single RGB LED or separate red, green, and blue LEDs. It should be understood, however, that other controllers having greater or fewer pins could also be used so long as the LED drive U1 contains at least the number pins corresponding to the number of LEDs or LED channels to be controlled directly by U1. Further, as will be described below, the ultimate number of controlled LEDs will not be limited by number of pins or LED channels, because each of the LED channels directly controlled by U1 can be cloned to control additional LEDs.

The sinking pin of the LED driver U1 can be utilized to sink a constant current through resistors R1, R2, and R3 into, for example, U1 pin 1, U1 pin 2, and U1 pin 3 (not shown), respectively. Because of the constant current sinking capability of even a low cost U1 controller, a precise constant voltage across resistors R1, R2, and R3 is developed, which optionally can be varied using the PWM duty cycle capabilities of LED driver U1 to compensate for circuit variance.

Because of the series circuit arrangement as shown, the integrated circuit LED driver's current sinks can set the current passing through resistors R1, R2, and R3, but also as well as the PNP sensing transistors Q1, Q2, and Q3.

The sensing transistors Q1, Q2, and Q3 have their collector and base terminals connected as shown, so the net collector-emitter voltages are equal to the base-emitter junction voltages for those transistors with that specific current (i.e., the LED drive current set by the controller, I1, I2, and I3).

The resistor and base-emitter voltage drops across the resistors R1, R2, and R3, and the transistors Q1, Q2, and Q3, respectively, are connected to additional driver transistors and resistors associated with additional, e.g., cloned, RGB LEDs. For example, the resistors R4, R5, and R6, and the transistors Q4, Q5, and Q6, can set the LED drive current in I4, I5, and I6, respectively. For example, the base-emitter voltage drop of Q1 is "reversed" through the transistor Q4 base-emitter to the resistor R4. The same is true with respect to the other LED channels. Provided the transistors and resistors of the cloned channels have similar values as the original channel (i.e. those directly connected to U1 (Q1, Q2, Q3)), then the voltage drops across R4, R5, R6, will be respectively similar to that of R1, R2, R3 and ultimately the currents I4, I5, I6 will be cloned to I1, I2, I3, respectively. Similarly, the resistors R7, R8, and R9, and the transistors Q7, Q8, and Q9, can set the LED drive current in I7, I8, and I9. This "impressing" of the specific voltage caused by the set current flowing through the resistor and transistor across additional transistors of the same type and resistors of the same value results in the current set by the integrated circuit being copied (cloned) in those additional transistor circuits. That is, I4 is a clone of I1, I5 is a clone of I2, and I6 is a clone of I3. This arrangement also has the effect of canceling the temperature, and other environmental effects, on the base-emitter voltage of the respective transistors. For example, regardless of the change in base-emitter voltage of, for example, Q1, the effect will be reversed/compensated for by Q4 in establishing the voltage drop of R4.

It should be noted that in practice the resistors associated with sensing transistors, i.e. those of the cloned channels, are slightly higher in value than those associated with driving (or direct) transistors (Q1, Q2, Q3). This is to compensate for the loss of the base current in the driving transistors. By way of example, for a 27 mA design, the difference in resistor values is just one step on the Electronic Industries Association (EIA) E96 resistor value table (137 Ohms for the sense transistor resistor vs 133 Ohms for the driver transistor resistor).

As described above, the circuit design of FIG. 1 is compatible with PWM.

Due to series topology, the cloned currents are used to drive additional LEDs above and beyond the controller's pin capacity. By copying the base emitter voltage for a specific current and impressing that onto a transistor of the same type, it compensates for temperature induced changes in VBE (voltage drop between the base and the emitter). Voltage developed across the emitter resistors in the driving transistor circuits serves to mask VBE voltage variance seen between individual transistors of the same type.

Figure 2:
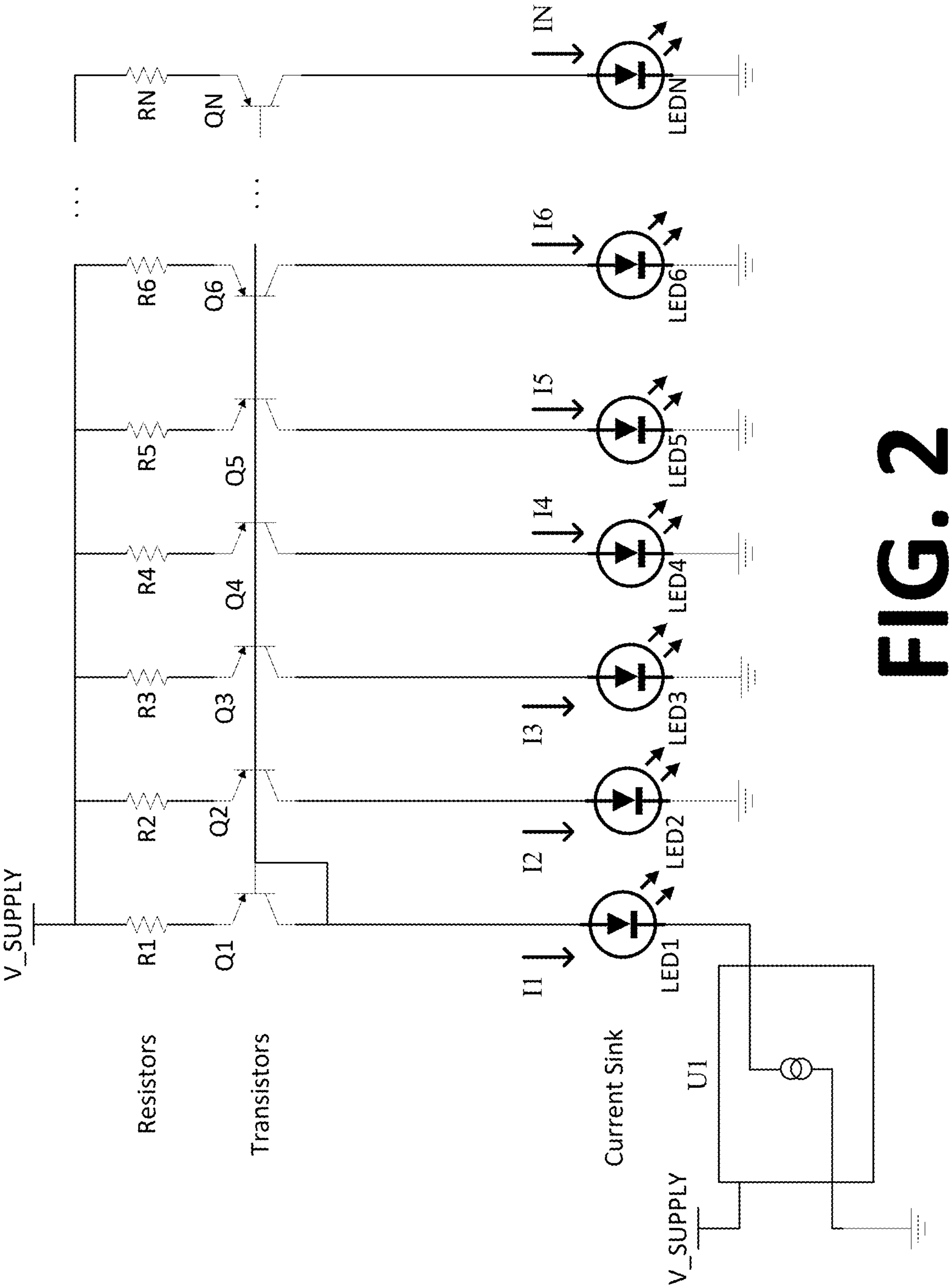
FIG. 2 is a schematic drawing of an LED integrated circuit showing a primary LED constant current circuit and N number of cloned LED circuits.

FIG. 2 is similar to FIG. 1, but instead of using an RGB LED, or discrete red, green, and blue LEDs, only a single primary, or directly driven LED using current I1, is shown and between one (LED2) and N (LEDN) secondary LEDs having current I2 through IN, respectively, is shown. While six secondary LEDs are shown with cloned current (I2, I3, I4, I5, I6, IN), FIG. 2 shows that the number of secondary LEDs may be expanded until N number of LEDs as symbolized by the ellipsis.

Figure 3:
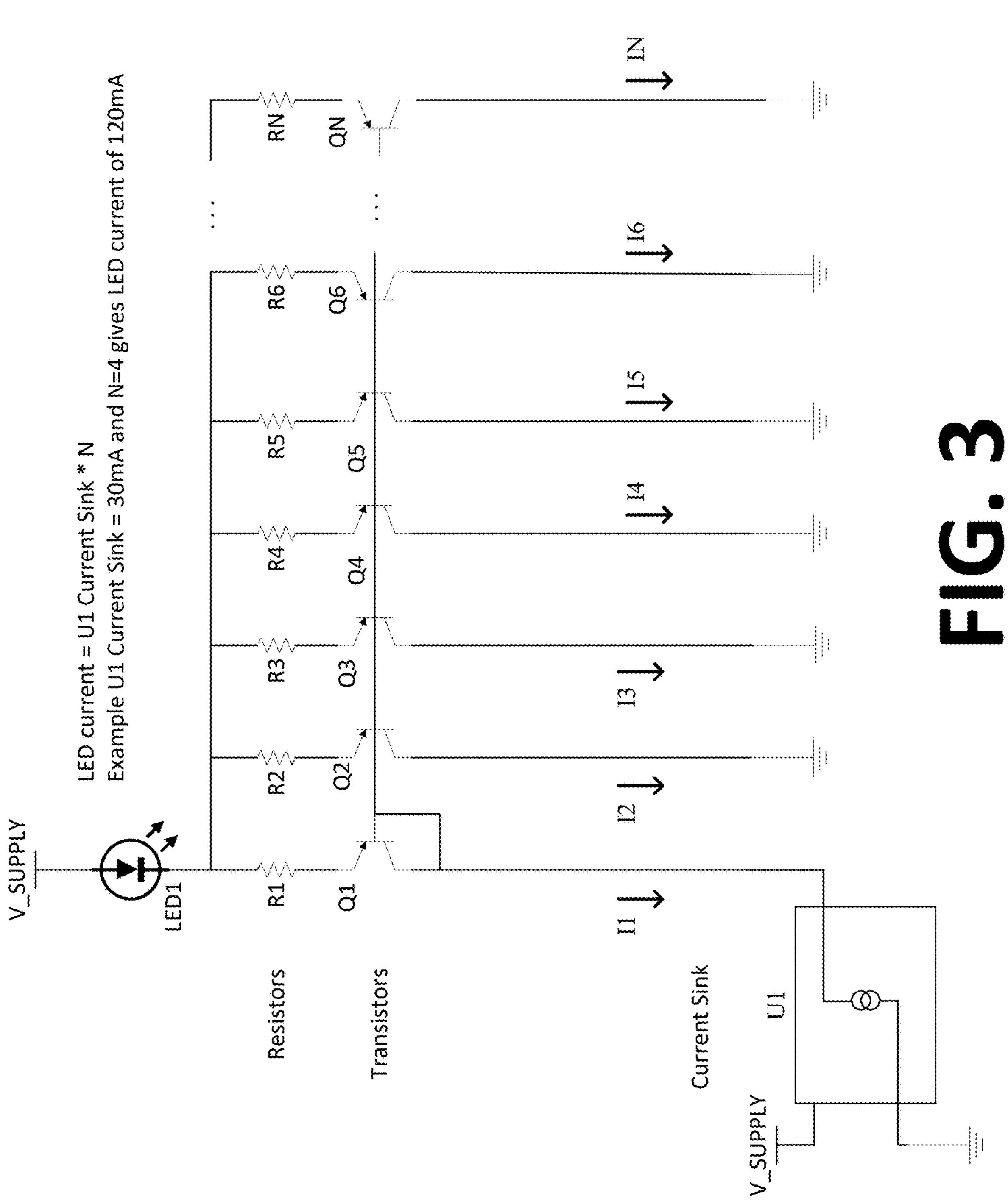
FIG. 3 is a schematic drawing of an LED integrated circuit showing a primary LED constant current circuit driven by and N number cloned current paths.

While the cloned currents discussed with reference to FIGS. 1 and 2 have been discussed as driving additional LEDs, e.g., LEDs labeled as LED4 through LED9 of FIG. 1 and LED2 through LEDN of FIG. 2, as noted above in ¶[0012] the cloned currents (e.g., I2-IN of FIG. 2) may also be combined into a higher current (compared to I1) through one higher powered LEDs instead of multiple LEDs. FIG. 3 is an example of such an alternative embodiment.

LEDs used in automotive and other applications likely should be driven with a constant current to meet optical and/or electrical requirements. This is because constant current operation is a preferred method to control light output from an LED in the presence of temperature changes and/or supply voltage changes. While specialized ICs exists that provide constant current LED drive, those typically available have a common limitation in that the drive current is relatively small, for example no more than about 60 mA of current. One example of such an IC is the Melexis MLX 81106, the data sheet for which is accessible at www.melexis.com/-/media/files/documents/datasheets/m1x81109-8-7-6-datasheet-melexis.pdf, which is hereby incorporate by reference in its entirety. However, many LED applications now require currents above that which can be supplied by a single IC. Accordingly, the example of FIG. 3 shows alternative configuration of FIG. 2 in which a single low-cost constant current LED driver, e.g, integrated circuit LED driver U1 can be configured to drive a high power (high current) LED1 even through U1 is not designed to sink the full current of LED1. This is accomplished by adding low-cost scalable discrete transistors Q1 through QN to scale the U1 current I1 "N" times, wherein N is an integer multiplier. Such a configuration provides a low-cost scalable configuration of while maintaining the benefits described above with respect to FIGS. 1 and 2, but with a single LED. While FIG. 3 is described in terms of a single LED, the configurations of FIG. 3 can also be combined with FIGS. 1-2 such that a high-power LED can be driven with a scaled and cloned current, while other lower power LEDs can be powered by a cloned current with either less or no scaling.

It should also be noted that the components of FIG. 3 may the same or similar to those described with respect to FIGS. 1-2, albeit LED1 of FIG. 3 may have a higher maximum current and the number N of cloned currents I, transistors Q, and resistors R may be chosen based on the current needs of LED1 (FIG. 3). For example, if U1 was capable of sinking 30 mA, and N was four, such that the circuit of FIG. 3 included transistors Q1 through Q4 and resistors R1 through R4, then the LED1 drive current could be up to 120 mA, which exceeds the current sinking capabilities of U1 alone.

U1 of FIG. 3 may alternatively have a plurality of current sinks and the remaining circuit of FIG. 3 could be duplicated such that a multi-channel, (e.g. RGB) LED could be supplied with high currents, each channel (R, G, and B) each having N times combined currents I1 through IN.

In use, electrical signals, including sensed current, in the above-described circuit may be managed by, for example, embedded software stored in an appropriate memory device on the same printed circuit board as the circuit or on one or more separate but electrically-coupled circuit boards. The present circuit may be interfaced with external circuits of, for example, an automotive vehicle electrical system, using one or more suitable electrical connectors, including industry standard pin and socket connectors. The embedded software may include one or more suitable algorithms that may receive signals from the external circuits that represent inputs from a user, such as a vehicle operator, that are intended to alter one or more conditions of the LEDs (for instance, increasing brightness, changing color mix, etc.). The memory device may include specific settings, as input to the software, that establish a state of the circuit and its LEDs when the device in which the circuit is installed is first turned on, turned off, or is in a particular operating condition (e.g., a vehicle operating during nighttime conditions).

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A light emitting diode (LED) lighting module comprising:

an LED having a plurality of parallel current paths;

an electrical connection for connecting the module to an external electrical system; and optionally a software stored in a storage media device for controlling electrical signals to the LED, wherein one of the plurality of parallel current paths is connected to a sensing transistor and a current sink to drive a constant current through the LED and each of the other of the plurality of parallel current paths have cloning transistors, and wherein a base of each of the cloning transistors and a base of the sensing transistor are electrically connected to each other.

2. A light emitting diode (LED) circuit comprising:

an LED having a plurality of current paths, a controller for controlling the LED, wherein the LED is connected to a first transistor and a first current sink to drive a constant current through the LED through a first current path, and wherein at least one cloning transistor establishes a parallel current path through the LED and parallel to the first current path and is connected such that the constant current in the first current sink is duplicated in the parallel current path.

3. The LED circuit of claim 2, wherein the controller comprises a software stored in a storage media device.

4. The LED circuit of claim 2, wherein the parallel current path is connected to a current sink separate from the first current sink.

5. The LED circuit of claim 2, wherein the first transistor comprises a first transistor base and a first transistor collector electrically connected to each other.

6. The LED circuit of claim 5, further comprising a plurality of cloning transistors with, respectively, a plurality of parallel current paths, wherein each of the plurality of cloning transistors comprises a cloning transistor base and a cloning transistor collector, wherein the first transistor base is electrically connected to at least one cloning transistor base.

7. The LED circuit of claim 5, wherein the first current sink is an integrated circuit LED driver.

8. The LED circuit of claim 7, wherein a combined current through the LED is greater than the constant sink current in the first current sink.

9. The LED circuit of claim 7, wherein the integrated circuit LED driver has a plurality of current sinking pins and each current sinking pin is associated with an LED, a respective first transistor, and at least one cloning transistor.

10. The LED circuit of claim 8, wherein a combined total of the first current path and the parallel current path outnumbers a number of current sinking pins of the controller.

11. The LED circuit of claim 6, wherein the first transistor base is electrically connected, respectively, to each of the cloning transistor bases.

12. The LED circuit of claim 6, wherein each of the plurality of cloning transistors comprises a cloning transistor emitter and each cloning transistor emitter is electrically connected to a voltage supply through a sense transistor resistor.

13. The LED circuit of claim 12, wherein the first transistor comprises a first transistor emitter and the first transistor emitter is electrically connected to the voltage supply through a driver transistor resistor.

14. The LED circuit of claim 13, wherein the driver transistor resistor has a driver transistor resistance, the sense transistor resistor has a sense transistor resistance, and the driver transistor resistance is about the same as the sense transistor resistance.

15. The LED circuit of claim 14, wherein the driver transistor resistor has a driver transistor resistor voltage drop and the sense transistor resistor has a sense transistor resistor voltage drop and the driver transistor resistor voltage drop and the sense transistor resistor voltage drop are about equal.

16. The LED circuit of claim 13, wherein the driver transistor resistor has a driver transistor resistance, the sense transistor resistor has a sense transistor resistance, and the sense transistor resistance is higher than the driver transistor resistance.

17. The LED circuit of claim 16, wherein the sense transistor resistance is higher than the driver transistor resistance by about one step on the EIA E96 resistor value table.

* * * * *